United States Patent [19]

Ganz et al.

[11] Patent Number: 5,303,165
[45] Date of Patent: Apr. 12, 1994

[54] STANDARDIZING AND CALIBRATING A SPECTROMETRIC INSTRUMENT

[75] Inventors: Alan M. Ganz, Trumbull; David H. Tracy, Norwalk, both of Conn.; Robert A. Hoult, Beaconsfield, England

[73] Assignee: The Perkin-Elmer Corporation, Norwalk, Conn.

[21] Appl. No.: 834,448
[22] Filed: Feb. 12, 1992
[51] Int. Cl.$^5$ .......................... G01R 35/00; G01J 3/42
[52] U.S. Cl. ............................... 364/571.01; 364/498; 356/325; 356/328
[58] Field of Search .................. 364/571.01, 571.02, 364/571.03, 571.04, 571.05, 571.07, 571.08, 498, 581, 582, 572; 356/319, 323, 325, 326, 328, 331, 334; 250/252.1 A

[56] References Cited

U.S. PATENT DOCUMENTS

| | | | |
|---|---|---|---|
| 3,646,331 | 2/1972 | Lord | 364/571.04 |
| 3,668,406 | 6/1972 | Reid et al. | 250/220 SD |
| 3,682,528 | 8/1972 | Apfel et al. | 350/1 |
| 3,698,814 | 10/1972 | Clark | 356/107 |
| 3,734,621 | 5/1973 | Moody et al. | 356/325 |
| 4,005,937 | 2/1977 | Barrett | 356/106 |
| 4,409,512 | 10/1983 | Walsh | 313/113 |
| 4,482,251 | 11/1984 | Saylor | 364/498 X |
| 4,692,883 | 9/1987 | Nelson et al. | 364/571.04 |
| 4,782,492 | 11/1988 | McMahon et al. | 372/34 |
| 4,916,645 | 4/1990 | Wuest et al. | 356/331 X |

FOREIGN PATENT DOCUMENTS

| | | | |
|---|---|---|---|
| 225210 | 10/1987 | European Pat. Off. | G01J 3/02 |
| 463600A3 | 2/1992 | European Pat. Off. | G01J 3/36 |
| 463600A2 | 2/1992 | European Pat. Off. | G01J 3/36 |

OTHER PUBLICATIONS

"Laptop chemistry: A Fiber-optic, field-portable, near-infrared spectrometer" by M. J. Kysaght, J. A. Van Zee, and J. B. Callis, Review of Scientific Instruments, vol. 62 No. 2, Feb. 1991, 507-515.
"Dauerjustiertes Diodenzeilen-Simultanspektrometer" by M. Machler, Feinwerktechnik & Messtechnik 96 (1988) Nos. 1-2, 13-17.
"Assessing Spectral Orthogonality" by John H. Kalivas, Applied Spectroscopy Reviews, 25 (1989) Nos. 3/4, 229-259.
"Information processing in spectroscopy" by K. Okada, Y. Ishibashi and A. Kitade, Applied Optics 28 (1989) Apr., No. 8 1546-1554.
"High spectral resolution, photon counting detector for Doppler temperature measurements in magnetically confined plasmas" by R. D. Benjamin, J. L. Terry, and H. W. Moos, Review of Scientific Instruments 58, Apr. (1987), No. 4, 520-529.
"A Simple Algorithm to Convert Diode Array Spectral Data to Linear Wavelength or Wave Number Scales" by M. Diem and F. Adar and R. Grayzel, Computer Enhanced Spectroscopy, vol. 3, 29-33 (1986).
"Fiber Optics In Astronomy" vol. 3, ed by Samuel C. Barden (Astro. Soc. of the Pacific, 1988), pp. 218-223.
"A Photodiode Array Based Near-Infrared Spectrophotometer For the 600-1100 nm Wavelength Region" by D. M. Mayes and J. B. Callis, Applied Spectroscopy 43 (1), 27-32 (1989).
"Self-Scanned Photodiode Array: High Performance Operation in High Dispersion Astronomical Spectrophotometry" by S. S. Vogt, R. G. Tull and P. Kelton, Applied Optics 17, 574-592 (1978).
"Self-Scanned Photodiode Array: A Multichannel Spectrometric Detector" by Y. Talmi and R. W. Simpson, Applied Optics 19, 1401-1414 (1980).

Primary Examiner—Jack B. Harvey
Assistant Examiner—Eric W. Stamber
Attorney, Agent, or Firm—H. S. Ingham; E. T. Grimes; J. R. Wahl

[57] ABSTRACT

A spectrometric instrument which exhibits an intrinsic profile for a sharp spectral line produces profile data for narrow spectral lines. The spectral lines are effected with a high finesse etalon of gold coated polymer. A transformation filter is computed for transforming the profile data to a gaussian profile. A wavelength calibration is combined with the filter to effect a correction matrix which is applied to sample data to generate calibrated standardized data. Iteratively a correction matrix is applied to calibration data to generate standardized calibration data which is utilized for the wavelength calibration. Calibration is effected with an optical standard, an interference etalon and a fringe formula. Etalon effective thickness is first estimated and then precisely determined so that fringe peaks calibrate wavelength.

51 Claims, 7 Drawing Sheets

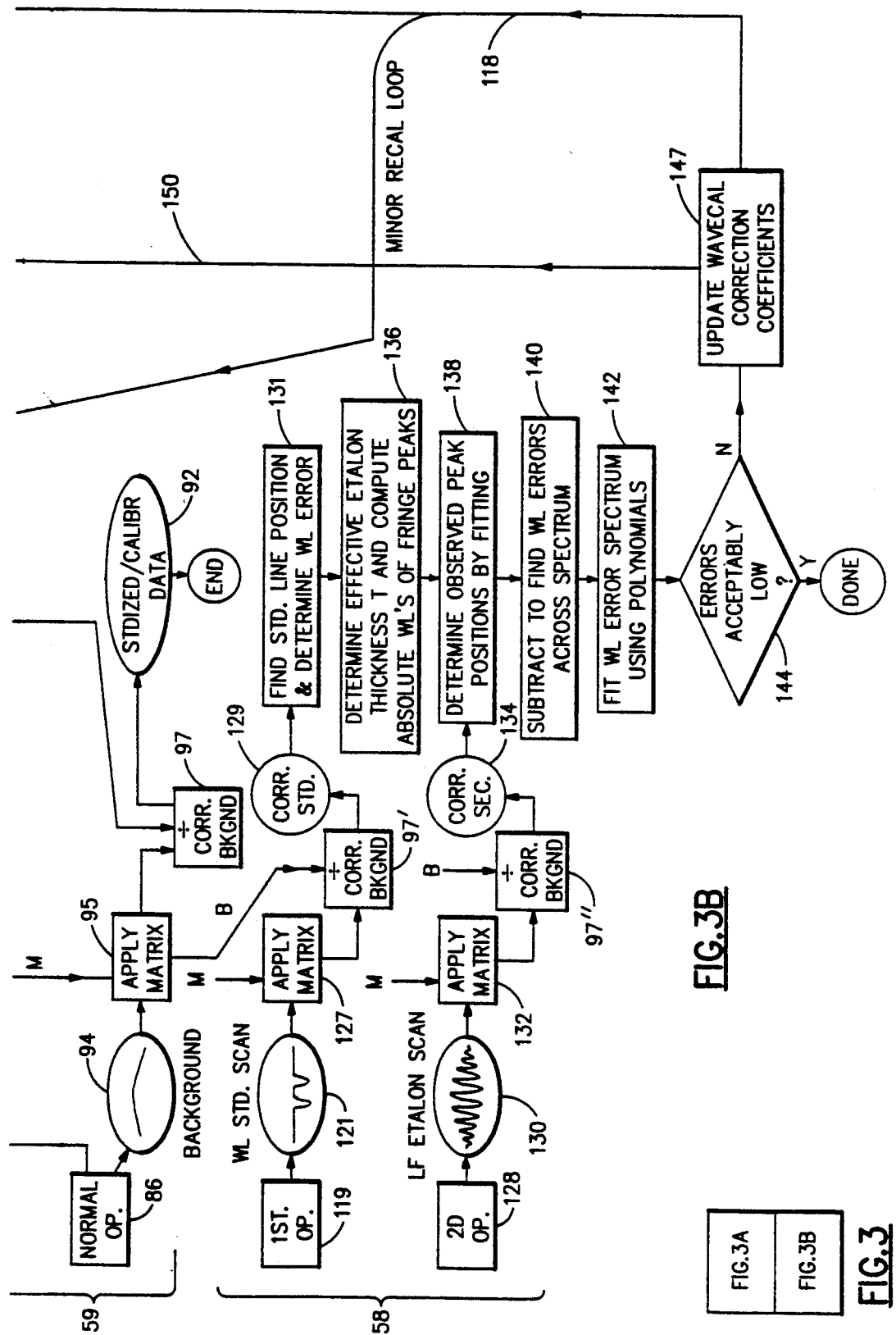

STANDARDIZING AND CALIBRATING A SPECTROMETRIC INSTRUMENT

This invention relates to spectrometric instruments, and particularly to the standardization and calibration of such instruments to correct for intrinsic distortion of spectral data by the instruments.

BACKGROUND OF THE INVENTION

Spectrometric instruments include a dispersion element, such as a diffraction grating, and a detector system. In one precision type the detector is a conventional solid state device comprising an array of individual pixel photodetectors in which pixel location represents wavelength detected. Such a detector typically is a photodiode array, a charge coupled device or a charge injection device. Other spectrometric instruments scan the dispersion element over a single photodetector, or use Fourier transform of an interferogram, but the concepts are the same in that wavelength is calibrated against a physical location, orientation or the like. Modern instruments include a computer that is receptive of spectral data from the detector to analyze and compare spectra.

With improvements in optics, detectors and computerization, there has evolved an ability to perform very precise measurements. An example is an absorption spectrophotometer or polychromator using chemometric mathematical analysis to measure octane number in gasolines. Differences in octane number are associated with subtle differences in near infrared (IR) absorption spectra. The very small changes in spectral characteristics cannot effectively be detected directly by personnel, and computerized automation is a necessity. It also is desirable for such spectral measurements to be effected continuously on line. Thus there is an interest in utilizing advanced spectrometry methods for analytical chemistry.

Calibrations are carried out typically with spectral measurements on standard chemicals of known composition or other properties similar to unknown samples to be tested. Chemometric models are built from these spectra using multivariate calibration methods such as Principal Component Regression (PCR) or Partial Least Squares (PLS). As in the case of gasoline octane, this may require a large number (e.g. 50-100) samples for suitable precision, and accuracy, and calibrations may need to be repeated frequently to account for instrumental drift. Such model buildup also requires close scrutiny and expertise.

Calibrations also are performed with lamps or transmission filters that provide certain spectral lines of known wavelength. As such sources are available only for a few wavelengths, a fringe pattern such as with a Fabry-Perot interferometer is utilized to calibrate across the desired spectral range. Correlating the known wavelength with a fringe pattern has been a challenge. A mathematical model for estimating wavelengths with a standard and an interferometer is taught in a text "Fiber Optics in Astronomy" Volume 3, ed. by Samuel C. Barden (Astro. Soc. of the Pacific, 1988), pages 218-223. These methods apparently have not been applied to the field of analytical chemistry.

A typical spectrophotometer is described in "A Photodiode Array Based Near-Infrared Spectrophotometer For The 600-1100 nm Wavelength Region", by D. M. Mayes & J. B. Callis, Applied Spectroscopy 43 (1), 27-32 1989) and "Laptop Chemistry: A Fiber-Optic, Field Portable, Near-Infrared Spectrometer" by M. Lysaght, J. Van Zee and J. B. Callis, Reviews of Scientific Instrum. 62 (2) 507-515 (1991). Articles concerned with design, self-scanning and performance of multichannel spectrophotometric detector systems are "Self-Scanned Photodiode Array: High Performance Operation in High Dispersion Astronomical Spectrophotometry" by S. S. Vogt, R. G. Tull and P. Kelton, Applied Optics 17, 574-592 (1978); and "Self-Scanned Photodiode Array: A Multichannel Spectrometric Detector" by Y. Talmi and R. W. Simpson, Applied Optics 19, 1401-1414 (1989).

A problem with high precision measurements is that instruments vary from each other, and each instrument varies or drifts with time. The problem is partly one of achieving and maintaining calibration. A more subtle aspect is that the instruments have intrinsic characteristics that are individual to each instrument and also vary with time. Intrinsic characteristics distort the data effected by the instrument, rendering comparisons inaccurate. Such an intrinsic characteristic is typified by the profile of spectral data representing a very narrow, sharp spectral line. Such a profile has an intrinsic shape and line width wider than the actual line, due to the fundamental optical design as well as diffraction effects and other imperfections in the optics and (to a lesser extent) electronics in the instrument. An ideal profile is symmetrical, close to gaussian, but an actual intrinsic profile, also known as "instrument profile", may not even be symmetrical.

Therefore, a primary object of the present invention is to provide a spectrometric instrument with a novel means for effecting standardized spectral data. A further object is to provide a novel method for standardizing spectrometric instruments, particularly instruments having an intrinsic characteristic that distorts data, more particularly instruments having a characteristic intrinsic profile for narrow spectral lines. Other objects are to provide a novel method and means for transforming all data of the instrument so that such data is standardized for comparison with any other such standardized spectral data.

Further objects are to provide an improved method and means for calibration of spectrometric instruments, and for incorporating the aforementioned standardizing into the calibration. Another object is to provide a novel high finesse etalon that may be utilized in the calibration. Another object is to provide an improved method of determining spectral peak location of an optical standard, particularly for effecting the calibration.

SUMMARY OF THE INVENTION

The foregoing and other objects are achieved by a method of standardizing a spectrometric instrument having a characteristic intrinsic profile for a hypothetically sharp spectral line in each segment of a selected spectral range, each intrinsic profile having an associated intrinsic width. The instrument includes a line source of at least one narrow spectral line in at least one selected spectral segment, generally in a plurality of tandem segments. Each narrow spectral line has an associated line width substantially narrower than the intrinsic width for a corresponding selected segment.

The method comprises specifying a target profile for a hypothetically sharp spectral line in each selected segment, such as a gaussian with a profile width roughly equal to the intrinsic width. The method further comprises initially operating the instrument with the line source to produce a set of profile data for each narrow spectral line such that each set of profile data is representative of the intrinsic profile for a corresponding selected segment, computing a transformation filter for transforming each set of profile data to a corresponding target profile for each selected segment, and saving the transformation filter for future application to sample data.

In normal use of the instrument, the method further comprises normally operating the instrument with a sample source to produce sample data representative of a sample spectrum, and applying the transformation filter to the sample data in each selected segment to generate standardized sample data representative of the sample spectrum.

The instrument should be preliminarily operated to store nominal background data. Thereafter, prior to the steps of computing and applying, all spectral data including the profile and the sample data are corrected with the nominal background data, preferably by dividing such spectral data by the nominal background data. Also prior to such steps, the spectral data should be calibrated according to ordinary intensity calibration.

In a preferable aspect the method further comprises establishing a wavelength calibration for the instrument, combining the wavelength calibration with the transformation filter to effect a correction matrix, and saving the correction matrix for future application to sample data. Thus the correction matrix is applied to sample data to generate calibrated standardized data representative of the sample spectrum.

More preferably the instrument is operated with a wavelength calibration source of radiation to produce calibration data. The transformation filter, or most preferably a correction matrix containing the filter, is then applied to the calibration data to generate standardized calibration data constituting the wavelength calibration.

In a further aspect of the invention for calibration, the instrument has a nominal (e.g. theoretical or preliminary) calibration of spectral wavelength versus spectral locations across the desired spectral range. The instrument further includes a calibration source of a primary spectral peak of precisely identified wavelength, such as a neodymium doped yttrium aluminum garnet filter. The instrument also includes a source of a multiplicity of secondary peaks spaced across the spectral band, advantageously fringes from a Fabry-Perot low finesse etalon such as an uncoated fused silica plate. Each secondary peak has an integer order number identified by a correlation function (e.g. a simple fringe equation) to a peak wavelength in accordance with a correlation constant.

In such further aspect, the step of establishing a wavelength calibration comprises the following: The instrument is additionally operated with the calibration source to produce calibration data representative of the primary spectral peak, and further operated with the multiple peak source to produce secondary data representative of the multiplicity of secondary peaks. The calibration data is ascertained from the primary peak location with respect to the spectral locations. From the secondary data, a set of secondary peak locations is ascertained with respect to the spectral locations. With the correlation function, the correlation constant is estimated in accordance with order number differential for at least two peak wavelengths determined by the nominal calibration. Also with the correlation function, a calibration order number is identified for at least one selected secondary peak located adjacent the primary peak, said identifying being effected in accordance with the estimated correlation constant and a preliminary wavelength determined for the selected secondary peak by the nominal calibration. A precise relative positioning of the selected secondary peak and the primary peak is interpolated from the selected secondary peak. With the correlation function, a precise correlation constant is calculated from the calibration order number, the precisely identified wavelength and the relative positioning. The precise correlation constant is then utilized with the correlation function to assign calibrated wavelengths to associated order numbers and thereby to secondary peak locations with respect to the spectral locations.

In another aspect of the invention, the calibration data define a calibration profile. The step of ascertaining comprises estimating a centroid wavelength of the calibration profile, reversing the calibration profile about the centroid wavelength to create a reversed profile, adding the calibration profile and the reversed profile to create a combined profile, and fitting the calibration data to the combined profile to determine an offset between the estimated centroid wavelength and the primary spectral peak. The offset thereby defines the primary peak location with respect to the spectral locations.

Objects are additionally achieved by a certain type of Fabry-Perot high finesse etalon for passing near-infrared spectral lines. The etalon comprises a thin polymer film having a semitransparent gold coating on each side thereof, each coating being sufficient to provide between 1% and 10% transmission. This etalon is utilized advantageously for effecting the aforementioned narrow spectral lines.

Objects of the invention are also achieved by a spectrometric instrument that further includes a standardizing system comprising means for effecting various aforementioned steps.

BRIEF DESCRIPTION OF THE DRAWINGS

FIGS. 3, 3A and 3B are a flowchart for a computer program utilized in the invention.

DETAILED DESCRIPTION OF THE INVENTION

Figure 1:
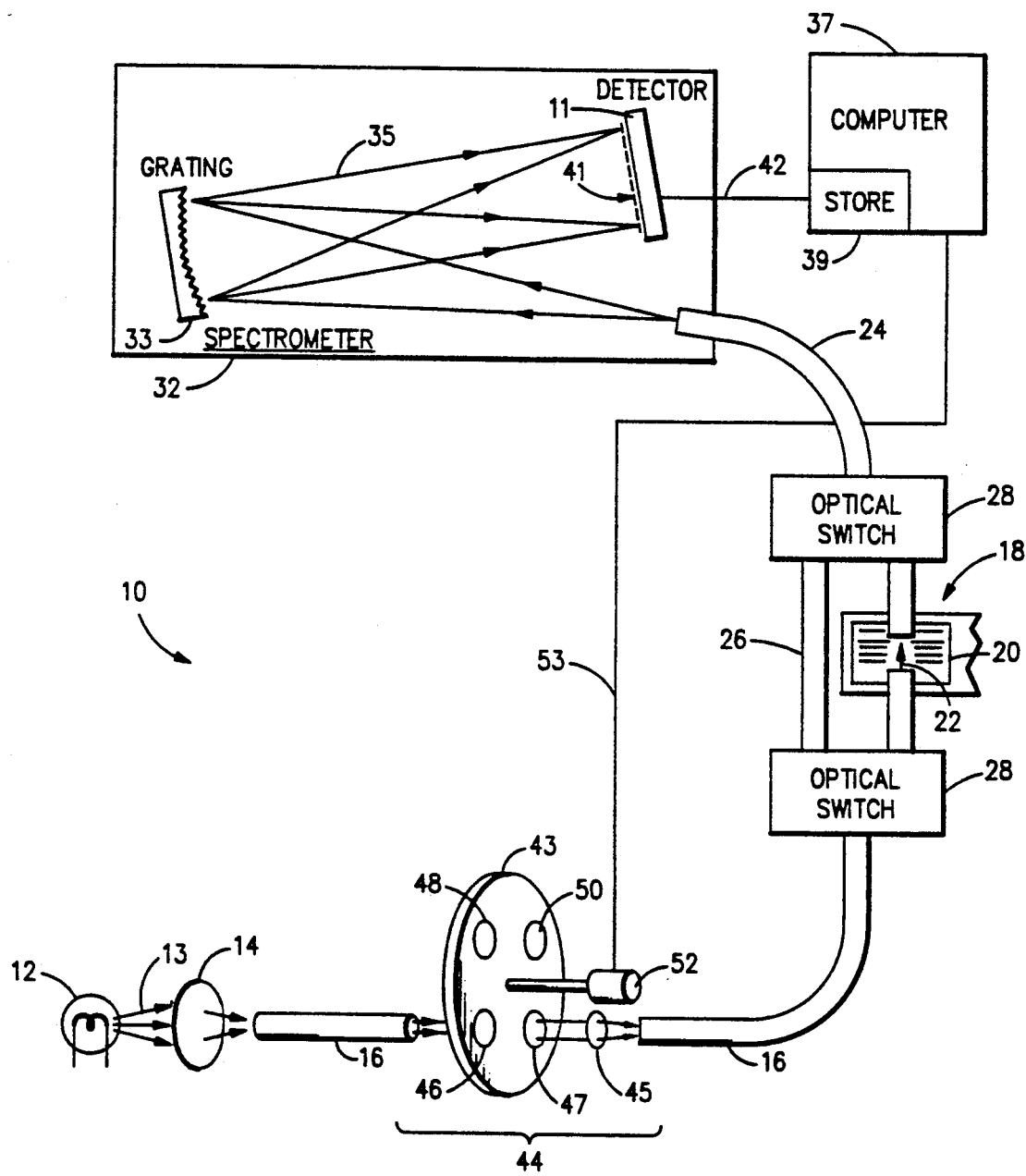
FIG. 1 is a schematic drawing of a spectrographic system incorporating the invention.

FIG. 1 illustrates a typical spectrometric instrument 10 having a photodetector 11 for which standardization and wavelength calibration is to be effected according to the present invention. Such an instrument may be, for example, an on-line chemometric spectrographic polychromator requiring high sensitivity and stability in the near infrared for measuring octane number of gasoline. A stable but otherwise ordinary incandescent light source 12 provides light 13 that passes through a relay lens 14 focused on an input end of an optical fiber 16. The fiber directs the light to a probe assembly 18 immersed in a liquid such as the gasoline to be tested. Although shown as a straight-through probe, the probe instead may have folding optics with reflections to lead light back into a return fiber such as disclosed in copending U.S. patent application Ser. No. 773,189 filed Oct. 8, 1991 of the present assignee, now U.S. Pat. No. 5,218,428.

In the probe a sample space 20 is provided for the liquid so that the light 22 is passed through the liquid, where some of the light may be filtered selectively. The filtered light is picked up by a second optical fiber 24. A bypass fiber 26 with optical switching 28 is provided for selectively bypassing the liquid with the light through the fibers, to provide a standard with which to compare the filtered light. Other optical reference means may be used instead of the bypass. The second fiber 24 carries the light to a spectrometer 32 utilizing, for example, a Concave holographic grating 33, which disperses the light 35 to the detector 11. Signals from the detector representing the spectrum are directed into a computer 37 for storing 39 on disk or other memory, and processing. In the present example, the spectrum is used as a "fingerprint" of the sample liquid, which may be compared to or calibrated against standard spectra, or used to build chemometric models.

The photodetector 11 is a conventional solid state type such as a RL1024S PDA produced by EG&G Reticon. Such a detector typically is a self scanned photodiode array, a charge coupled device, or may be a charge injection device, or the like. This has a linear array of adjacent photosensitive pixel areas 41, for example 1024 such pixels. The pixels are read out sequentially to produce voltage signals fed through a line 42 to the computer 37.

To implement the invention a collimation zone 44 is provided in one of the fibers for inserting a disk 43 having several openings therein as shown in FIG. 1. An associated pair of lenses 45 (one shown) pass collimated light through a selected opening between fiber ends. One opening 47 is left empty for passing unfiltered light for normal operation of the instrument to measure samples or background. The other openings contain optical filter elements 46,48,50 described below. The disk is positionable manually or, more normally, by motor 52 automatically by computer 37 via line 53 (e.g. at selected intervals for recalibrating) for the selected opening or filter.

A spectrometric instrument typically introduces line broadening and distortion because of imperfect optics. This effect may be described in terms of a characteristic intrinsic profile 54 of spectral line shape, with respect to wavelength (or wave number or frequency), (FIG. 2) for a very sharp spectral line in the spectrum. The profile may vary across the spectrum, i.e., the profile band width and distortion may vary. For the present purpose at least one segment of a spectrum (e.g., the segment shown in FIG. 2) is selected in the spectral range of interest. An intrinsic instrument profile of spectral line shape exists and is identified for each selected segment. Each such profile has an associated intrinsic bandwidth W' conventionally defined as the width of the profile at half height.

Figure 3A:
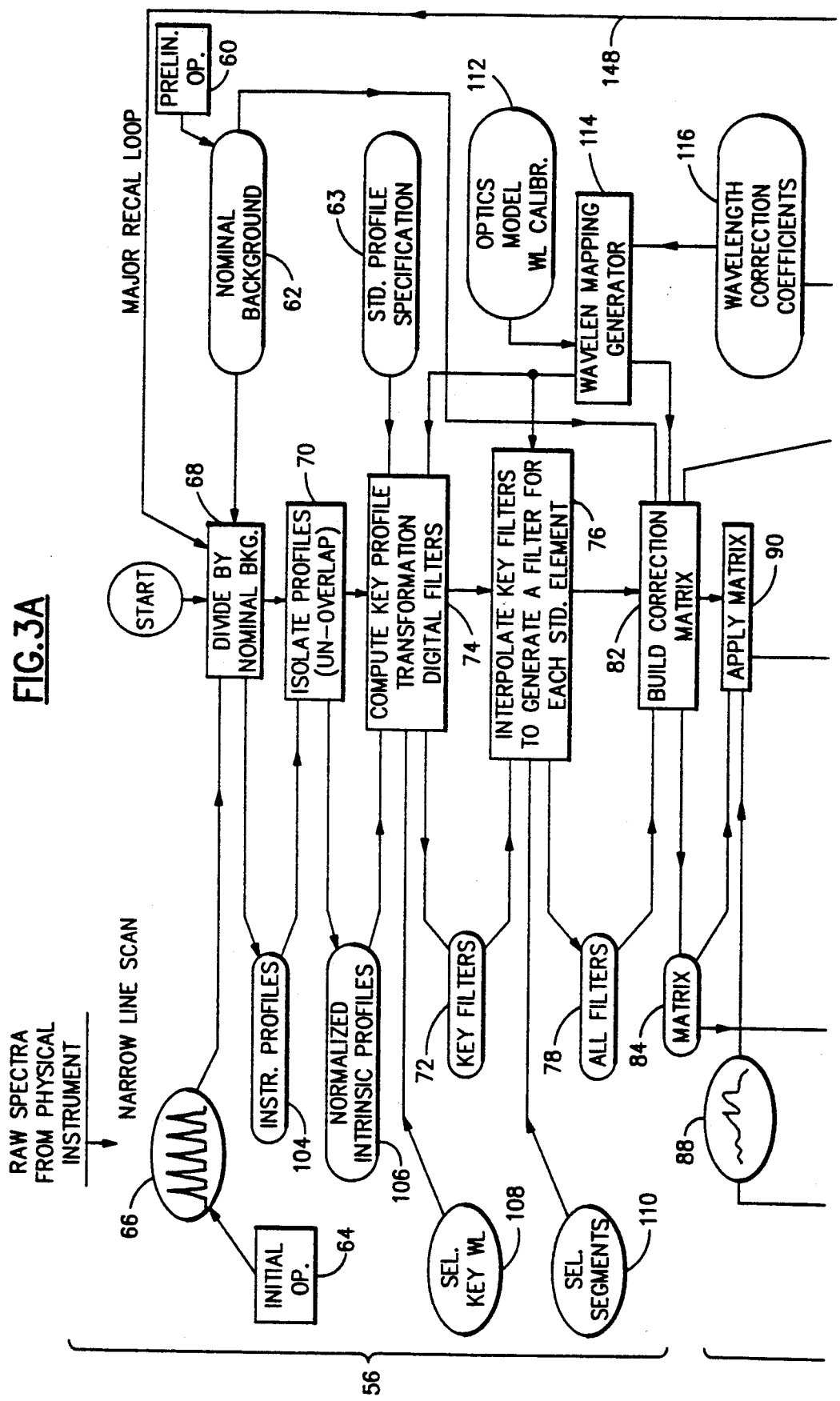

A flowchart of the overall standardizing and calibration procedure is shown in FIGS. 3A and 3B, illustrating method and means for implementing the invention. The present invention has two general aspects, namely a profile standardization 56 involving construction of a transformation of the profiles of the spectra to an absolute standard replacing instrumental effects, and a precision wavelength calibration 58. Advantageously these two aspects are utilized together at two stages: In one stage the transformation is applied to calibration data during the calibration determination. In the other stage the transformation and the wavelength calibration are combined into a correction matrix. This matrix is then applied 59 to all subsequent data including sample data, iterations on recalibrations and updated standardizations. (As used herein and in the claims, the term "data" refers to signal information from the detector related to intensity of radiation incident on the detector for the detected wavelength, and also refers to such information in a normalized, transformed or other treated form as specified herein.)

Profile Standardization

Figure 2:
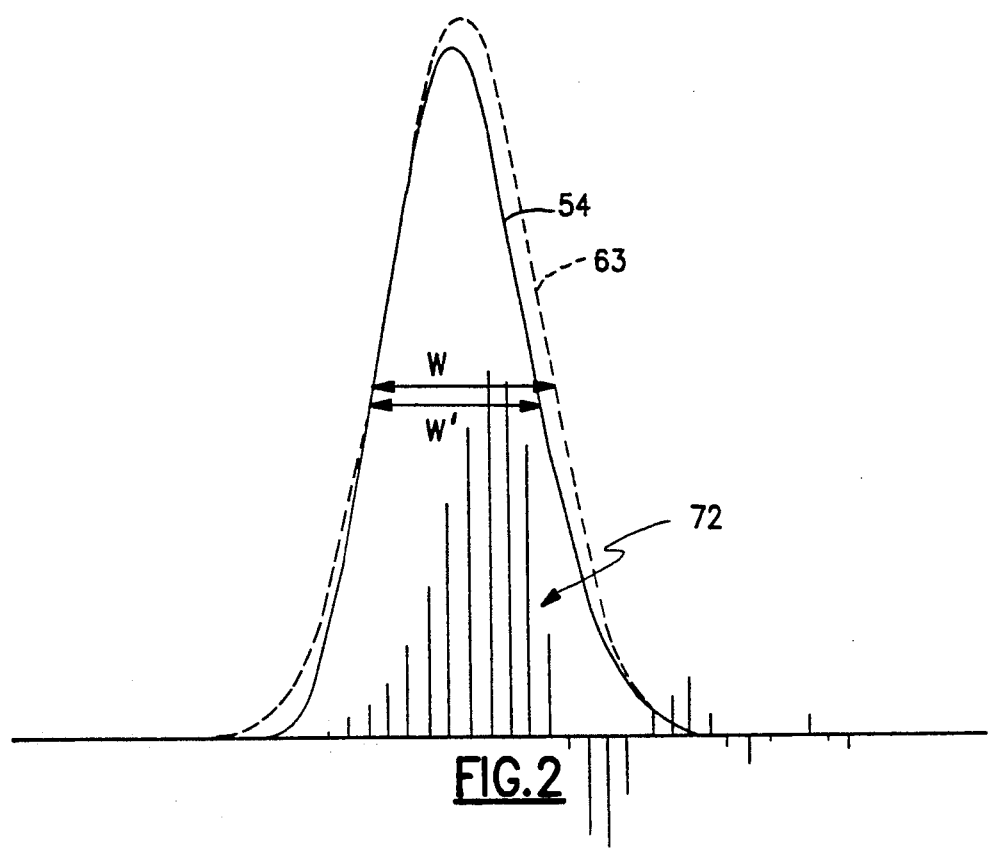
FIG. 2 is a spectral plot illustrating an intrinsic profile of a spectrographic instrument, a target profile selected according to the invention, and an associated transformation filter.

For the profile standardization 56, and more specifically with reference to the flowchart, the instrument is preliminarily operated 60 to measure and store nominal background data 62. A target profile 63 of spectral line shape, intended to replace the intrinsic profile by transformation of data, is specified for a hypothetical narrow spectral line in each selected segment; for example, as shown in FIG. 2 and as explained below, the target profile 63 may be gaussian. A line source provides at least one narrow spectral line in each selected segment, each such line having an associated line width substantially narrower than the intrinsic width for a corresponding selected segment. The raw spectral data for each of these lines will have an associated profile (FIG. 2) due to the instrumental effects.

The instrument is initially operated 64 with the line source to store a set of profile data 66 for each of the selected narrow spectral lines, each peak in the profile data being representative of the intrinsic profile for a corresponding selected segment. The profile data is normalized 68 by dividing it by the nominal background data 62. After an isolation step 70 to produce normalized intrinsic profiles 106, explained below, a transformation digital key filter 72 for each selected segment is ascertained 74 by computer program, such that the filter transforms each intrinsic profile 106 to a corresponding target profile 63. Interpolations 76 are preferably applied to fill in gaps between the selected segments so as to generate all filters 78, one such filter being for each of a set of selected spectral elements across the spectral range of interest.

In a preferred embodiment, a wavelength mapping calibration for the instrument is established, such as with procedures 58 described below. The wavelength calibration is combined with the transformation filters 78 to build 82 a correction matrix 84 which is stored for general use 59 on measured data when the instrument is normally operated.

The instrument is normally operated 86 with sample radiation to store measured data 88 representative of a sample spectrum. The sample may be virtually any source of radiation, direct or transmitted, scattered, reflected, fluorescent etc., for example atomic emissions or the aforementioned transmitted radiation through gasoline. The correction matrix 84, containing the transformation filter, is then applied 90 to the data to generate standardized, calibrated data 92 representative of the sample spectrum and background. These can be further processed chemometrically to extract desired information.

An alternative is to apply the profile transformation filters directly to the measured data and then apply the wavelength calibration separately. However, it will be appreciated that the combination into the correction matrix provides convenient, single step treatment of the data.

The measured data is described herein with respect to pixels. Such designation is intended to represent not only a multiplicity of photoreceptive areas on a photoreceptor, but also any other equivalent spectral locations in physical increments (physical mapping) of spectral points such as in a scanning or Fourier transform instrument. After transformation filtering, units are arbitrary and only need to be calibrated to wavelength which, if transformation is ideal, is absolute wavelength. Such units are termed herein "standardized units" and are in "standardized increments" for "standardized data" representing "standardized spectra," and need not have 1:1 correspondence with pixels or other physical increments. For example, there may be only about half as many standardized increments as pixels over a desired IR spectral range.

Some signal pretreatment as part of the operation of the instrument should be performed on all raw signal data coming from the detector. This includes intensity calibration, i.e. ordinate linearization. Such calibration may be effected by any known or desired precision method, such as disclosed in the present assignee's copending application Ser. No. 823,631 filed Jan. 21, 1992, now U.S. Pat. No. 5,229838. Another pretreatment is substraction of dark signals, i.e. signals with light blocked off.

All signal data should be normalized with the nominal background 62. Such a background may be estimated, or preferably determined by preliminarily operating the instrument to store such nominal background data. The exact shape of the nominal background is not critical; the purpose is to remove most of the fixed pattern variation and gross spectral variation. Once determined, this nominal background is stored permanently and always applied consistently (without change) to all other data prior to any further treatments of the data except the pretreatment. The normalizing is effected by dividing the data by the nominal background. Except for the profile data (Step 66), it is most convenient in computerized computations to incorporate the nominal background into the correction matrix 84 to eliminate separate computational steps.

In typical cases of absorption type spectra, all sample and calibration data 88, 121, 130 (explained further below) are corrected in the conventional manner for ordinary background 94 (as well as nominal background) taken at about the same time as the data. In such case the data and ordinary background are first standardized and calibrated (90, respectively) by applying the correction matrix 84. Then the preliminarily corrected sample or calibration data are further corrected (97, 97', 97") for ordinary background, usually by dividing by the corrected background. This produces corresponding fully corrected data 92, 129, 134 respectively. In other cases such as emission, scattering or fluorescence, the foregoing corrections for ordinary background may be omitted.

A further step, not shown and optional as far as the present invention is concerned, may be the conventional conversion of data from transmittance to absorbance. This is generally only for absorption spectra and is effected by taking a logarithm of the matrix-corrected data. In this case the matrix-corrected ordinary background is also converted and subtracted from the other data.

As indicated above, a spectrometric instrument ordinarily displays a characteristic intrinsic profile 54 (FIG. 2) that is generally non-ideal and asymmetrical and may vary over the spectrum of interest. More importantly, at a high precision level, the profile varies from instrument to instrument and even from time to time. A prime objective of the invention is to transform such line shape in an output spectrum to a uniformly defined target profile 63. More generally, all spectra produced by the instrument, line or otherwise, are transformed in the same manner, so that the output spectra are no longer instrument-dependent and may be compared with very high precision.

A step in the present invention is to specify the shape and width of the desired target profile 63. This is the spectral shape desired for the single beam spectrum of a very sharp, narrow input line (e.g., atomic emission or laser line). It is also the desired shape for a very weak, sharp absorbance feature where the true underlying absorption line has negligible width. The target profile may be any convenient, mathematically definable shape that is reasonably comparable to the instrument profile such as gaussian, supergaussian, convoluted gaussian, rectangular or triangular. Advantageously, the target profile is gaussian in shape. The target profile width W is normally chosen to be about the same as, or slightly greater than, intrinsic widths W' although it can be somewhat less; i.e. the profile width W should be nominally equal to the intrinsic width W' of the instrument profiles. If necessary, the target profile width and other parameters may be specified to vary as a function of wavelength, either because the resolution requirement of the measurement varies or because the worst-case resolution of the physical instrument varies significantly across the spectrum. For generality, the target profile width may be specified as a polynomial (up to 4th order) in absolute wavelength. However, where possible, it is preferable not to vary the width and perhaps to allow only a linear variation across the working spectral range.

Figure 4:
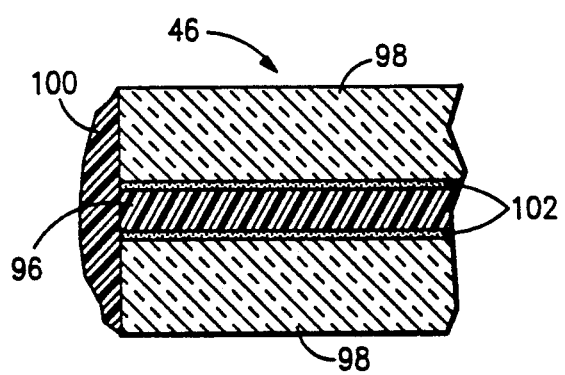
FIG. 4 is a cross section of a high finesse etalon according to the invention.

To produce the transformation, a set of characteristic instrument profiles 66 is generated 64 and stored from a line source having a series of very sharp spectral lines across the spectral region of interest. The source of lines is not critical as long as there are sufficient lines for the purpose and they are sharp. A series of laser lines or an atomic emission line source may be used, if a sufficient number of lines can be provided. The lines should be substantially narrower than the intrinsic width, preferably less than 20% of the intrinsic width. A particularly suitable source of lines is a high finesse Fabry-Perot etalon 46 inserted into the white light radiation beam as one of the filters in the disk 43 (FIG. 1). ("Finesse" is defined conventionally as the ratio of spectral line spacing to line width in a series of regularly spaced interferometer fringe lines.) The term "high" means the finesse should be at least about 30. A highly advantageous form of etalon (FIG. 4) is a polymer film 96 such as nitrocellulose. In the etalon structure, the film may be stretched over a ring or, advantageously, sandwiched between a pair of planar glass windows 98 with index-matched optical cement 102. An epoxy encapsulation or other seal 100 should encircle the structure.

The film should be of thickness such as to provide appropriate density of peaks, neither too close (excessive overlap) nor too far apart. The line spacing (free spectral range) is given by $LS=L^2/2nl$ where L=wavelength, n=index of refraction of film and l=thickness of film. More particularly, for the present purpose, the film should be generally between 10 and 25 microns thick, preferably about 15–20 microns for the near-infrared range (800–1100 nm) when the intrinsic profile width is 2–3 nm. The film is coated on both sides with a semitransparent gold coating 102. Each gold coating should provide between 1% and 10% transmission, for example about 4%, generally achieved with approximately 300–400A thickness of gold. Such an etalon has been found to provide very sharp fringe lines with a finesse of about 40.

As described, the profile data 66 is normalized by dividing (68) it by the nominal background 62. The initial normalized profiles 104 may have some overlapping wings which should be modified at the tips by curve substitution to remove the overlaps (70). Key transformation filters 72, e.g. 15 such key filters, required to convert from modified intrinsic profiles 106 to target profiles are computed (74) for an initial set of selected spectral wavelengths 108. Interpolations are made (76) between the selected wavelengths to establish a set of transformation filters 78 suitably covering the desired spectral region, in terms of pixel locations. It has been found to be more accurate to effect all of the filters from interpolations, substituting for the original key filters. Wavelength calibration 80 is then combined with the filters 78 over the pixel range, to effect the correction 84 matrix which is stored for future application to sample data to generate standardized data representative of a sample spectrum.

Figure 5:
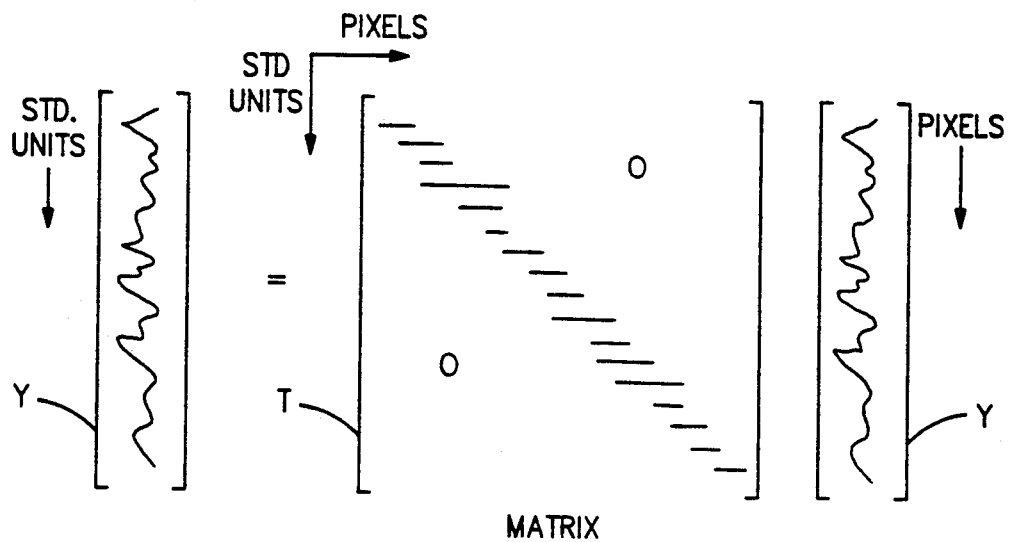
FIG. 5 is an illustration of a vector multiplication utilizing a correction matrix according to the invention.

The vector process of converting raw spectra into standardized spectra is illustrated in FIG. 5. The transformation is a linear one, and so the conversion is implemented as a simple vector-matrix multiplication. The vectors represent calibrated spectral intensity vs wavelength over the selected spectrum. If the standardized spectral vector is Y, the raw spectral data vector is y, and the transformation matrix is T, then $Y=Ty$.

For real situations, the information needed to generate a particular standardized spectral element comes essentially from a limited segment of the raw spectrum, a region of width amounting at most to several times the instrument profile width. Thus most of the coefficients $T_{ij}$ in the matrix T can be taken as zero. Each row of the matrix contains a few (typically 20–40) nonzero elements, on or near the diagonal, so that the matrix T can be stored efficiently in compact form, and the actual matrix multiplication can be relatively fast. The units of the vectors Y and y are not equal in general. Typically 1024 pixels are in y and 500 to 750 spectral increments are in the standardized vector, but the latter number can vary widely depending on the requirements of the application.

The standardized units are arbitrarily defined in terms of absolute wavelength; i.e. pixels are not directly calibrated. The correction matrix 84 effects the calibration so that sample data is related directly to wavelength.

Wavelength Calibration

An outline for wavelength (WL) calibration of the instrument is included in the flowchart of FIGS. 3A and 3B. A stored initial wavelength calibration 112 is provided conventionally by a nominal instrument calibration using an optical model of the instrument augmented by use of a calibration lamp to determine critical parameters. The optical model computation is effected by normal methods from the physical arrangement of the instrument. The initial calibration can and should be reasonably accurate, for example 99.9% accurate. An initial correction matrix 84 is generated (82) with the initial calibration. Subsequent precision calibration spectral data from physical standards in the instrument are treated (generally 58) with a refined correction matrix 84 built from the initial matrix, via refinements made with one or more iteration loops 118.

The initial calibration is in terms of spectral wavelength versus spectral locations such as photodetector pixels across a desired spectral band. Although the term "wavelength" is used herein and in the claims, wave number or frequency may be utilized as being equivalent for the purpose.

Figure 6:
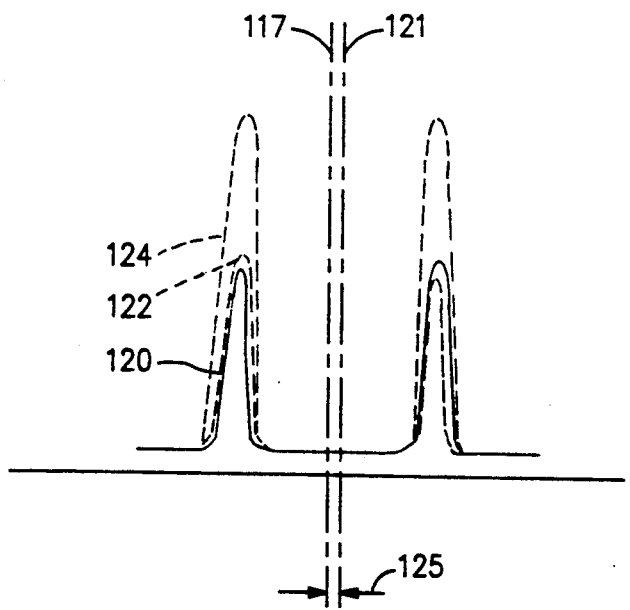
FIG. 6 a spectral plot illustrating a double peak calibration profile and a treatment thereof according to the invention.

The instrument includes a physical standard calibration source of at least one primary spectral peak of precisely identified wavelength. A preferred source is an optical standard 48 inserted in the radiation beam, by way of the disk 43 (FIG. 1). An especially suitable optical wavelength standard for short-wave near-infrared is a neodymium doped yttrium aluminum garnet (Nd:YAG) crystal filter which absorbs at two proximate primary spectral peaks of precisely identified wavelengths (approximately 938.5 and 946.0 nanometers.) The two peaks together define a central primary spectral peak 117 (FIG. 6) at a precisely identified wavelength. (As used herein and in the claims, the term "spectral peak" means the center of a single peak as well as, more generally, an identified center of several peaks such as the Nd:YAG doublet.)

For the calibration steps (FIGS. 3A and 3B), the instrument is first operated 119 with the wavelength calibration source to produce calibration data 121 representing the primary spectral peak and defining a calibration profile. The calibration data is modified by the pretreatments described above including ordinate calibration, and is corrected (127) by the correction matrix 84 and for background (97') to generate corrected standard peak data 129. The latter advantageously includes the nominal background normalization, and also includes a wavelength calibration which initially is from the optics model or subsequently via an iteration loop from a prior calibration sequence.

The apparent wavelength of the center (peak) of the WL standard profile is determined by any of several methods. In a preferred aspect 131 of finding the wavelength standard profile location (FIG. 6), the original calibration profile 120 is stored, and this profile is also reversed about an estimated centroid wavelength 121 with respect to the spectral locations to create a reversed profile 122. The stored profile and the reversed profile are then added to create a fully symmetric combined profile 124. The original calibration data 120 is then fitted to the combined profile 124 to determine an offset 125 between the estimated centroid wavelength 121 and the primary spectral peak 117. The offset thus defines the primary peak location with respect to the spectral locations.

The offset 125 of the WL standard profile 120 from the nominal center is precisely determined by a conventional least squares fitting procedure using the combined profile 124 and its derivative with respect to wavelength as model components. The resulting center position 117 is used to calibrate one point in the corrected spectrum to the known reference wavelength. Details are set forth below under Examples of Computational Methods.

The instrument is further provided with a physical standard source for producing a multiplicity of secondary peaks spaced across the spectral band, each secondary peak having an integer order number identifiable to a peak wavelength in accordance with a correlation constant. A suitable standard is a Fabry-Perot low finesse etalon 50, preferably an uncoated fused silica plate of about 50 microns thickness, disposed in the disk 43 (FIG. 1). This optical element transmits the radiation in a fringe pattern of the multiplicity of secondary peaks. The element has an index of refraction (n) related slightly to wavelength in a well-defined and well known relationship. Fringe order number (m) is identified to peak wavelength (L) in accordance with the correlation constant (T') by the standard fringe equation $m = nT'/L$. The term T' is two times an effective thickness of the element; i.e. T' is approximately 2T where T is actual thickness. As the constant T' can be determined very accurately by procedures disclosed herein, the actual thickness need not be known. Also, the procedures will average out nonuniform thickness and temperature-induced changes and account for slight misorientation of the etalon in the instrument, which may vary from time to time.

The instrument is secondly operated 128 (FIGS. 3A and 3B) with the low finesse (LF) etalon to produce secondary data 130 representing the secondary peaks which have peak locations ascertained with respect to pixels. The secondary data are corrected 132 by the matrix 84 to produce corrected secondary peak data 134. On the first round, the peak wavelengths are only approximate, being no more accurate than the optical model calibration contained in the correction matrix applied. The next step 136 utilizes the above equation in conjunction with the accurately known wavelength of the primary peak 117 (or its centroid equivalent) of the Nd:YAG crystal, to accurately locate the secondary (fringe) peaks with respect to the pixel locations, or more directly with respect to standardized locations which relate by calibration to the pixel locations.

The correlation constant T' is first estimated in accordance with at least one selected order number and a corresponding peak wavelength determined by the nominal calibration. This estimate is conveniently effected by fitting wavelengths to the above equation and taking a derivative to provide the slope T'. A calibration order number, i.e. true integer order number, is then identified for a selected secondary peak located adjacent the primary peak, such identification being in accordance with the equation, the estimated correlation constant and a preliminary wavelength determined for the selected secondary peak by the nominal calibration. Order numbers for all other secondary peaks are then established by simply counting up and down from the calibration number.

A practical order number for the primary peak is interpolated from secondary peaks on either side of it, one being the selected secondary peak. A precise correlation constant is then calculated from a fractional order number and the precise primary peak wavelength. The precise correlation constant is utilized with the above equation to assign absolute calibrated wavelengths to associated order numbers and thereby to secondary peak locations with respect to the spectral locations. The wavelength correction coefficients 116 are stored, the wavelength mapping 114 is updated, and the correction matrix 84 is also updated.

With continued reference to FIGS. 3A and 3B, after absolute wavelength (WL) determination (136), the observed peak locations in the secondary data are fitted (138) to develop a preliminary model of apparent wavelength locations (according to current wavelength calibration), and the peaks in this model are subtracted (140) from the assigned absolute calibrated wavelengths to provide wavelength errors across the spectrum. The errors are curve fitted using polynomials (142), and a decision is made (144) as to whether the error curve is within a predetermined acceptable level. If not, the steps are iterated on the minor recalibration loop 118, which has a branch 150 to include an update 147 of wavelength correction coefficients 116 for the mapping generator 114. If so, the calibration is deemed complete (146), and the correction matrix 84 is held ready for application to sample data.

The procedure of FIG. 3A and 3B operates iteratively, with two loops, namely a major recalibration loop 148 and the minor recalibration loop 118. All operations are parameter table driven and run automatically. Normally, major recalibrations are performed infrequently, or when repairs are made to the system. These are relatively computation intensive and time consuming. Minor recalibrations are quicker and can be made as frequently as needed, according to the passive stability of the optical system. Normally, the minor loop is iterated until convergence is obtained in that the corrections to mapping polynomial correction coefficients become negligible. This may require 3 to 4 iterations on the initial factory calibration, but usually only or 2 thereafter.

The programming means for carrying out the foregoing steps is conveniently and readily achieved with a conventional computer language such as "C" generally available through the supplier of the operating system utilized with the computer. Curve fitting is conventional and programs therefore are readily available. The overall program may be compiled, for example, on a Digital Equipment Corporation Model 316+ computer that may be associated with the spectrometer.

This invention provides for a common standardization of data produced by each instrument having the same selected target profile. The standardization is such that all such data derived from various instruments, and from each instrument from time to time, is as if it were all produced by a single hypothetical unchanging instrument. Such hypothetical instrument has as its intrinsic profile the selected target profile, and has a wavelength accuracy virtually as precise as desired in the setting of error acceptance level, except as limited by signal/noise (S/N) ratio and reproducibility of the primary wavelength standard calibration source. Recalibrations from time to time can be completely automated, so that an instrument can provide continuously accurate output data. Such an instrument is especially suitable for detecting very subtle differences in radiant transmissions or emissions, such as for monitoring gasoline octane by near infra-red transmission.

It will be appreciated that the invention generally provides for standardizing a spectrometric instrument having an intrinsic characteristic representing a distortion of spectrometric instrument data effected by the instrument. The invention includes specifying a hypothetical target function (profile) for spectrometric standardized data. The target function is comparable to the intrinsic characteristic, such as a gaussian of similar width to an intrinsic profile. A transformation function (e.g. a matrix) is determined for transforming the intrinsic characteristic to the target characteristic, and the transformation function is applied to instrument data to generate standardized data. If wavelength calibration is utilized, it should be combined with the transformation function to effect a correction function, which is applied to instrument data to generate calibrated standardized data.

EXAMPLES OF COMPUTATION METHODS

Isolate Profiles

The normalized profiles may have overlapping wings which should be modified to remove the overlaps. Any suitable procedure may be used. A wing model found useful is the following (for each valley):

$$y(p) = a_L exp[-b_L^*(p-p_V)] + a_R exp[b_R^*(p_V-p)] + C$$

where P=pixel number, P=valley center pixel, C=baseline constant offset,
$a_L$, $a_R$=amplitude of Left, Right exponential wing,
$b_L$, $b_R$=exponential slope coefficient of (L,R) wing.

Figure 8:
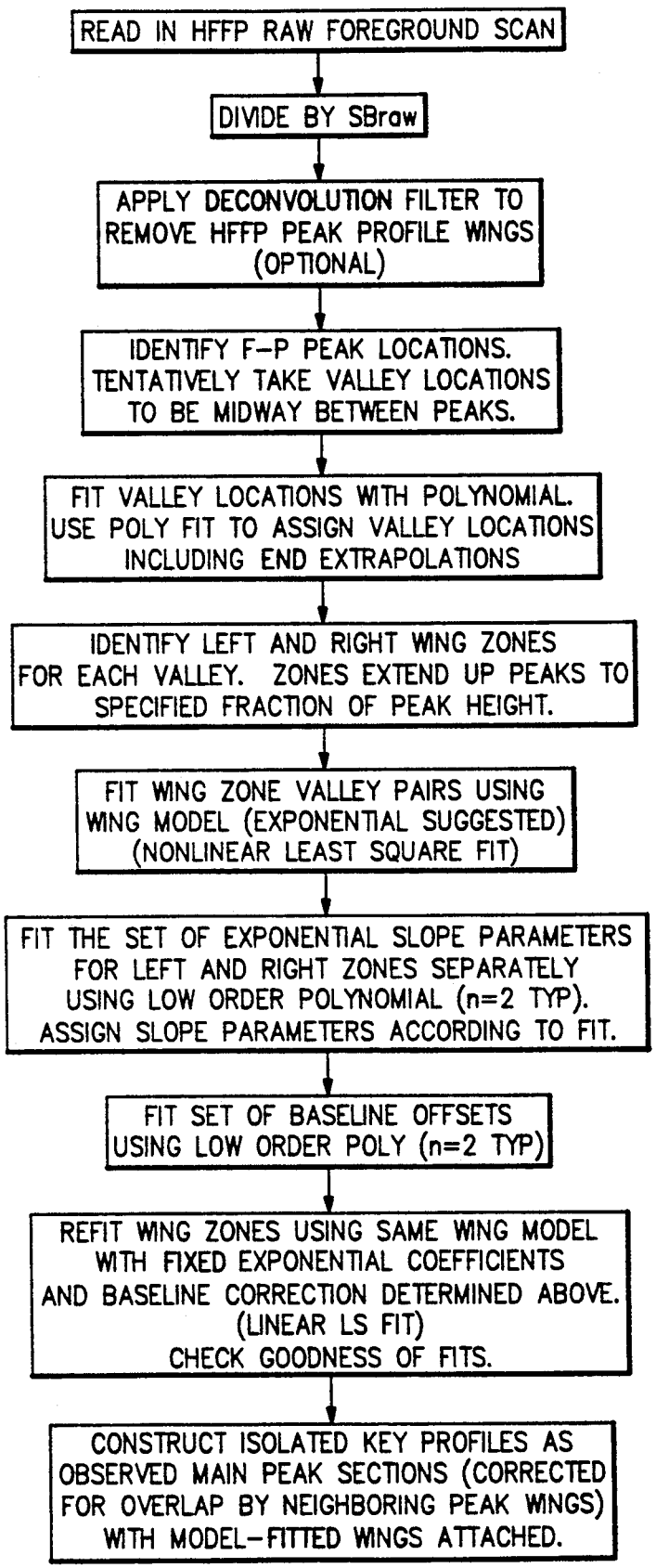
FIG. 8 is a detailed flowchart for a step to isolate profiles in the flowchart of FIGS. 3, 3A and 3B.

In the initial 5 parameter nonlinear fitting round, each valley is fitted to yield $a_L$, $b_L$, $a_R$, $b_R$, and C. In the next stage the baseline is replaced by a global polynomial fit to the C's. The b values are replaced by smoothed values resulting from a polynomial fit to the first round values (left and right independently). The two a coefficients in each valley are then refitted using a simple linear LS fit (2 parameters only). The resulting exponential wing models are then joined to the observed profile cores to provide separate isolated key profile estimates. A flowsheet for the procedure is given in FIG. 8.

In using the transmission peaks of a gold coated high finesse etalon to measure the instrument profiles at regular intervals across a spectrum, some error arises because the etalon profiles are not perfectly sharp. This imperfection is due to finite gold reflectivity and to thickness nonuniformity. As a result, the profile transformation filters are slightly in error, with the result that the subsequently transformed profiles of truly sharp lines (such as laser lines or gas emission lines) turn out to be narrower than the prescribed gaussians. For many applications the error is small and can be ignored, but when necessary it can be largely eliminated by a deconvolution procedure, in which the raw etalon spectrum is corrected for the finite gold etalon fringe width before any processing, including the division by the nominal background. The correction can be found by separate measurements using a much higher resolution spectrometer or, alternatively, by comparing the gold etalon peaks to gas emission line peak shapes. Deconvolution filters can be computed with a least squares regression technique which is identical to that used in computing the filters herein.

Profile Transformation Digital Filters

A set of Key Filters is generated, at least one for each of the Key Profiles above. The filter sizes $n_F$ (number of elements in physical pixel units, always odd) are specified in advance. The user may specify several groups of filters to span the spectral range, each with different sizes. This allows optimization of memory use and speed, since narrower filters can be used in parts of the spectral range where they are sufficient, and wider filters used only where necessary (because of poorer instrument resolution or more exacting chemometric requirements). Group allocation also permits use of very short filters at the extremes of the spectral range in order to minimize the "dead zone" at each end.

The profile digital filters (PDF) are designed and computed to be those linear filters of specified length $n_F$ which minimize the mean square error between the transformed raw profiles and the corresponding target profiles. The computation method is straightforward and well known. The coefficients $F_i$ which make up the filter are determined as the fit coefficients in a normal linear least squares regression in which the model vectors are successively shifted copies of the raw profile, and the target profile function to be fitted is the desired target profile (typically gaussian).

The regression calculation may be weighted uniformly, or the extremes of the profile may be preferentially weighted to improve filter performance in the wings. Filters are scaled to unit sum of coefficients. Moreover, the filter is designed to produce minimal shift of the peak centroid. This is accomplished by first computing the centroid of the raw profile. A corresponding offset is then incorporated into the synthetic target profile, so that the filter need produce no profile shift. In spite of this precaution, the resulting filters always have some residual shift effect, as evidenced by their non-zero centroids.

The calculation is performed entirely in pixel space. Therefore, in synthesizing the target profile which is the target of the least squares regression which generates the filter, one must take into account the mapping of standardized elements onto pixels, a mapping which varies over the spectrum. In addition, the width of the target profile may be specified to be wavelength dependent. Therefore, Key Filter generation can be done correctly only when the wavelength calibration is complete and accurate. On the first pass, the mapping will necessarily be approximate, so that the filters generated will be somewhat inexact. Accordingly, the entire procedure must be iterated at least once (the major recalibration loop). The errors are, however, of second order in the wavelength error and convergence of the PDFs is very rapid.

In order to carry out the instrument standardization, one needs a filter for each selected spectral element. In general, each filter will be slightly different. In practical cases, the variation of physical instrument profile is gradual enough that PDFs can be successfully interpolated between Key Filters. The interpolation procedure occurs in the space of arbitrary (standard wavelength) units (substituting for pixel space after transformation), and is carried out coefficient by filter coefficient. When different sized groups of filters are used, interpolation is carried out only within each group. The key filters included in each group overlap so that key profiles near the group boundaries are used to generate PDF's for both sizes. This ensures that PDFs for every standardized element can be obtained by interpolation on filters of one group or another, except at the extreme ends of the spectral range, where extrapolation may be required.

Any standard interpolation method can be used to derive intermediate filter coefficients at a particular element. Three point Lagrange interpolation effectively uses a quadratic fit to 3 points (i.e., the $j^{th}$ coefficients of 3 successive filters). Linear interpolation/extrapolation is used at the end regions (Lagrange 2 Point Interpolation). Key filters are not necessarily equally spaced.

Generation of The Calibration Matrix

Once the interpolated PDF's are in hand, and an estimate of the wavelength mapping between standardized elements and Pixels exists, the matrix which actually performs the transformation can be built. For the $i^{th}$ row of the matrix, corresponding to the $i^{th}$ standardized element, all zeros are used except for a non-zero segment on or near the diagonal of the matrix. This segment is basically the corresponding PDF, modified to generate the correct fractional pixel shift according to the wavelength mapping. Also, each element is divided by the fixed nominal background pixel spectrum to introduce the desired normalization. The segment center is positioned to point to the pixel which comes closest to mapping into the $i^{th}$ element Specifically, the non-zero segment of the $i^{th}$ row is given by $\{G_i = F_i \text{ [convolution] } S_i\}$, where $F_i$ is the PDF filter for the $i^{th}$ standardized element, and $S_i$ is a shifting filter to perform full pixel plus sub-pixel adjustments of the mapping. After this convolution, the individual elements of $G_i$ are normalized by dividing the respective background normalization elements $B_j$: $T_{ij} = G_{ij}/B_j$. The coefficients $S_{ij}$ are nonzero only over a few pixels around the closest pixel mapping from standardized element i. They are computed so as to implement a linear transformation which amounts to the appropriate sub-pixel interpolation which is needed to account for (a) the fractional part of the mapping, and (b) the parasitic shift due to the non-zero centroid of the PDF $F_i$.

The choice of interpolation method used to generate the shifting filters depends on the quality of the raw data. When spectra are reasonably oversampled (e.g. 10 pixels/profile width) and the S/N is very high ($>10^4$), fairly simple interpolation methods are adequate. In particular, the shift can be implemented using low order Lagrange interpolation (usually 4 point, corresponding to fitting a cubic polynomial to 4 points straddling the interpolation fractional pixel value.) The 4 Lagrange coefficients constitute the shifting filter $S_i$. When it is convolved with the PDF $F_i$, the segment length increases by 3 pixels.

Wavelength Standard Measurement

The raw spectrum of the wavelength standard (e.g., Nd:YAG laser crystal, 6 mm thick, doped ~0.5%) is standardized and converted to double beam absorbance form, that is, the standardized intensity spectrum is divided by a standardized background measured contemporaneously, and the result converted to absorbance ($-\log_{10}$). A window is searched around the expected location of the standard line. Upon finding a peak (or double peak), a peak location algorithm is used to determine its position in standardized units (equivalent to absolute wavelength, provided that calibration has converged). The offset of the observed peak position from its known true position is then noted, in standardized elements.

A suitable peak location algorithm follows: First, a rough peak find is performed. This is the highest spectral point in the search window. In case of symmetric multiplets we pretreat the spectrum by superimposing and adding multiple copies of the spectrum which are shifted symmetrically by the known multiplet spacing, as close thereto as the standardized element spacing allows without interpolation. This results in a composite pseudospectrum which has a single highest peak at the center of symmetry of the multiplet. The peak location can now be refined by computing the centroid of this pseudospectrum center peak (about its highest point). The centroid calculation requires that a lower level of cutoff be established; this is done as a fixed fraction of the peak height above baseline.

With this refined peak location estimate in hand, we return to the original standardized double beam spectrum (not the pseudo spectrum). Taking the estimate as a provisional peak center, we flip the spectrum left to right about this point. Since this flip point is not, in general either on or midway between data points, generating a flipped version which is sampled on the original grid requires interpolation. Cubic splines or Lagrange interpolation are both suitable for the purpose. The left-right inverted spectrum is then added to the original spectrum to produce a peak shape model, similar to the actual peak shape, but guaranteed symmetric about the flip point by construction. The original spectrum is then fitted using ordinary linear least squares regression using as model vectors: (a) the symmetrized peak shape model, (b) the numerical derivative of the peak shape model, and (c) one or more polynomial background terms (typically a constant, linear term, and quadratic term). A shift of the observed line can be modelled to first order as an admixture of its first derivative. Accordingly, the least squares fit coefficient corresponding to the derivative vector is a measure of the peak shift from its assumed position. This is valid so long as the shift is a small fraction of the peak width, which condition is assured by the rough peak finding procedure above. A technique for determining the shift is disclosed in copending U.S. patent application Ser. No. 771,705 filed Oct. 4, 1991 of the present assignee, now abandoned.

It may be desirable to measure a second wavelength standard line, e.g one located at 853 nm in the Nd:YAG. This one is used to determine the instrument wavelength dispersion early in the calibration sequence, and avoids possible mistaken identification of marker etalon fringe numbers. It has no effect on the ultimate calibration.

Secondary Peak Measurement

Figure 7:
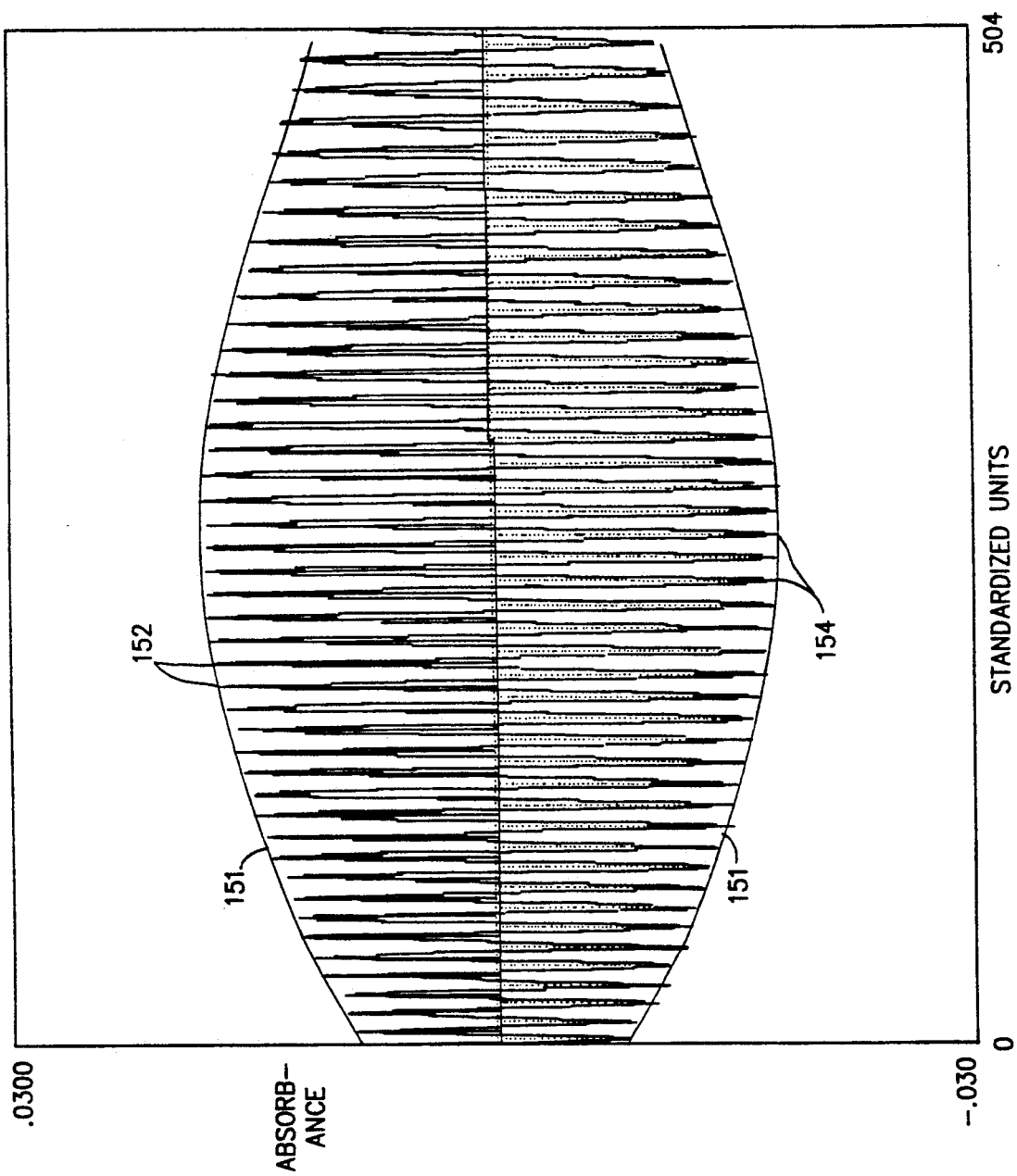
FIG. 7 is a spectral plot illustrating a low finesse spectrum utilized in the invention.

A single low finesse fringe spectrum is used to determine the effective etalon thickness and measure standardized calibration abscissa errors at each peak (and valley) of the fringes. A mean-centered double beam standardized absorbance fringe spectrum in an envelope 151 is shown in FIG. 7. Peaks 152 and valleys 154 (which constitute peaks for the present purpose) are located approximately by finding the zero crossings of the fringes. The peaks and valleys are taken to be approximately midway between zero crossings in wavenumbers (reciprocal wavelength).

A least squares regression is performed to establish the envelope of the fringes, by fitting a polynomial (of order≧2) simultaneously to the peak and valley points. This envelope fit is used later in the fringe analysis. Standardized units are transformed into reduced wavenumber or Z units according to $Z=sn(s)$, where $s=(1/L)$ is wavenumber (cm$^{-1}$) (vacuum) and $n(s)$ = refractive index of etalon material as a function of wavenumber. The etalon equation is written as $m=ZT'$ where m=order of interference, $T'$=twice effective thickness of the etalon.

Plotting the fringe number against Z locations of fringe peaks and valleys gives a highly linear plot. When a straight line fit to the points is performed, the slope gives a first estimate of twice the effective thickness: $T'=dm/dZ$. The absolute order number m of the ith fringe peak can then be found using $m_i=INT(ZT')$. After assigning the correct order number to each fringe (integer for peaks, half integer for valleys, if used), one can then perform a single parameter least squares fit (slope only, no intercept) to more accurately determine $dm/dZ$, and hence the effective thickness. This is the "improved estimate" for $T'$.

At this point, the fringe number at which the wavelength standard line occurs is found. To do this, several (typically 2 to 5) adjacent fringe extrema straddling the standardized unit location of the wavelength standard (as determined above) are examined in detail. In particular, their peak (valley) Z locations are accurately measured by a procedure to be described below.

The order numbers m of these few fringes are then plotted against their measured Z locations and a straight line fit (linear regression) performed. The m intercept on this regression line by the vertical line $Z=Z$(wavelength standard, observed) then gives the fractional order number $m'$ corresponding to the WL standard wavelength. One then can then calculate a final best estimate for twice effective etalon thickness from $T'=m'/Z$ (wavelength standard, absolute).

The fringes are now computed one by one. For each there is (a) computed the theoretical Z location based on the effective thickness and (b) measured the observed Z location using a fitting procedure (below). The difference is taken as the calibration error at this point in the spectrum. Also, this same information is converted to wavelength error vs physical pixel number. A polynomial fit to the WL errors is then performed, typically of order 3 or 5. The coefficients of this fit, if larger than a specified threshold, are then used to update the master wavelength mapping polynomial correction coefficients by direct subtraction.

The secondary standard (low finesse etalon) peaks and valley are precisely located by a linear fitting procedure. Small zones of the spectrum surrounding each peak (valley), typically 0.7 to 1.5 fringes wide, are individually least squares fitted using as model functions synthetic modified sine and cosine fringes of appropriate period in Z space. The sine and cosine functions are modified by multiplying them by the envelope function determined above. Baseline offset terms are also included in the fits. Peak location offsets are given by the ratio of sine to cosine regression coefficients.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

We claim:

1. A method of standardizing a spectrometric instrument having a characteristic intrinsic profile of spectral line shape for a hypothetically thin spectral line in each segment of a selected spectral range, each intrinsic profile having an associated intrinsic width, the instrument including a line source of at least one narrow spectral line in at least one selected segment of the spectral range, and each narrow spectral line having an associated line width substantially narrower than the intrinsic width for a corresponding selected segment, the method comprising:

specifying a target profile of spectral line shape for a hypothetically sharp spectral line in each selected segment, initially operating the instrument with the line source to produce a set of profile data for each narrow spectral line such that each set of profile data is representative of the intrinsic profile for a corresponding selected segment, computing a transformation filter for transforming each set of profile data to a corresponding target profile for each selected segment, and saving the transformation filter for future application to sample data.

2. The method of claim 1 further comprising normally operating the instrument with a sample source to produce sample data representative of a sample spectrum, and applying the transformation filter to the sample data in each selected segment to generate standarized sample data representative of the sample spectrum.

3. The method of claim 2 further comprising preliminarily operating the instrument to store nominal background data, and correcting the profile data and the sample data with the nominal background data.

4. The method of claim 3 wherein the steps of correcting comprise dividing the profile data and the sample data by the nominal background data.

5. The method of claim 3 wherein the step of normally operating includes further operating the instrument to produce normal background data associated with the sample data, the step of applying includes further applying the transformation filter to the normal background data to generate standardized background data, and the method further comprises correcting the standardized sample data with the standardized background data.

6. The method of claim 2 further comprising calibrating the profile data according to a preselected spectral intensity calibration prior to the step of computing, and calibrating the sample data according to the intensity calibration prior to the step of applying.

7. The method of claim 1 wherein the target profile has a profile width nominally equal to the intrinsic width.

8. The method of claim 1 wherein the target profile is Gaussian.

9. The method of claim 1 wherein the at least one selected segment comprises a plurality of tandem segments across the selected spectral range, each tandem segment having at least one narrow spectral line.

10. The method of claim 9 wherein the line source is a high finesse Fabry-Perot etalon.

11. The method of claim 1 further comprising establishing a wavelength calibration for the instrument, and combining the wavelength calibration with the transformation filter to effect a correction matrix, wherein the step of saving comprises saving the correction matrix for future application to sample data.

12. The method of claim 11 further comprising normally operating the instrument with a sample source to produce sample data representative of a sample spectrum, and applying the correction matrix to the sample data to generate calibrated standardized data representative of the sample spectrum.

13. The method of claim 11 wherein the step of establishing comprises operating the instrument with a wavelength calibration source of radiation to produce calibration data, applying the transformation filter to the calibration data to generate standardized calibration data constituting the wavelength calibration.

14. The method of claim 13 further comprising preliminarily operating the instrument to store nominal background data, and correcting the calibration data, the profile data and the sample data with the nominal background data.

15. The method of claim 14 wherein the steps of correcting comprise dividing the calibration data, the profile data and the sample data by the nominal background data.

16. The method of claim 11 wherein the instrument has a nominal calibration of spectral wavelength versus spectral locations in the spectral range, the instrument further includes a calibration source of a primary spectral peak of precisely identified wavelength and a multiple source of a multiplicity of secondary peaks spaced across the spectral range, each secondary peak has an integer order number identified by a correlation function to a peak wavelength in accordance with a correlation constant, and the step of establishing a wavelength calibration comprises:

additionally operating the instrument with the calibration source to produce calibration data representative of the primary spectral peak, and further additionally operating the instrument with the multiple source to produce secondary data representative of the multiplicity of secondary peaks;

ascertaining from the calibration data a primary peak location with respect to the spectral locations, and further ascertaining from the secondary data a set of secondary peak locations with respect to the spectral locations;

estimating with the correlation function the correlation constant in accordance with order number differential for at least two peak wavelengths determined by the nominal calibration;

identifying with the correlation function a calibration order number for at least one selected secondary peak located adjacent the primary peak, said identifying being effected in accordance with the estimated correlation constant and a preliminary wavelength determined for the selected secondary peak by the nominal calibration;

interpolating from the selected secondary peak a precise relative positioning of the selected secondary peak and the primary peak;

calculating with the correlation function a precise correlation constant from the calibration order number, the precisely identified wavelength and the relative positioning; and utilizing the precise correlation constant with the correlation function to assign calibrated wavelengths to associated order numbers and thereby to secondary peak locations with respect to the spectral locations.

17. The method of claim 16 wherein the multiple source comprises a source of radiation and a first optical element inserted in the radiation, the first optical element has an index of refraction (n) related to wavelength, and the order number (m) is identified to peak wavelength (L) in accordance with the correlation constant (T') by the correlation function $m = nT'/L$.

18. The method of claim 17 wherein the multiple source is a Fabry-Perot low finesse etalon disposed to transmit the radiation in a fringe pattern comprising the multiplicity of secondary peaks.

19. The method of claim 18 wherein the low finesse etalon comprises a plate of uncoated fused silica.

20. The method of claim 16 wherein the calibration data define a calibration profile, and the step of ascertaining comprises storing the calibration profile, estimating a centroid wavelength of the calibration profile with respect to the spectral locations, reversing the calibration profile about the centroid wavelength to create a reversed profile, adding the calibration profile and the reversed profile to create a combined profile, and fitting the calibration data to the combined profile to determine an offset between the estimated centroid wavelength and the primary spectral peak, whereby the offset defines the primary peak location with respect to the spectra locations.

21. The method of claim 20 wherein the calibration source is a neodymium doped yttrium aluminum garnet filter.

22. A method of establishing a precision wavelength point in a spectrometric instrument including a calibration source of a spectral peak of precisely identified wavelength, the instrument having a nominal calibration of spectral wavelength versus spectral locations in a spectral range, the method comprising operating the instrument with the calibration source to produce calibration data defining a calibration profile representative of the spectral peak, storing the calibration profile, estimating a centroid wavelength of the calibration profile with respect to the spectral locations, reversing the calibration profile about the estimated centroid wavelength to create a reversed profile, adding the calibration profile and the reversed profile to create a combined profile, and fitting the calibration data to the combined profile to determine an offset between the estimated centroid wavelength and the spectral peak, whereby the offset defines a primary peak location with respect to the spectral locations.

23. The method of claim 22 wherein the calibration source is a neodymium doped yttrium aluminum garnet filter.

24. A method of precisely calibrating wavelength in a spectrometric instrument having a nominal calibration of spectral wavelength versus spectral locations in a selected spectral range, the instrument including a calibration source of a primary spectral peak of precisely identified wavelength and a multiple source of a multiplicity of secondary peaks spaced across the spectral range each secondary peak having an integer order number identified by correlation function to a peak wavelength in accordance with a correlation constant, the method comprising:

additionally operating the instrument with the calibration source to produce calibration data representative of the primary spectral peak, and further additionally operating the instrument with the multiple peak source to produce secondary data representative of the multiplicity of secondary peaks;

ascertaining from the calibration data a primary peak location with respect to the spectral locations, and further ascertaining from the secondary data a set of secondary peak locations with respect to the spectral locations;

estimating with the correlation function the correlation constant in accordance with order number differential for at least two peak wavelengths determined by the nominal calibration;

identifying with the correlation function a calibration order number for at least one selected secondary peak located adjacent the primary peak, said identifying being effected in accordance with the estimated correlation constant and a preliminary wavelength determined for the selected secondary peak by th nominal calibration;

interpolating from the selected secondary peak a precise relative positioning of the selected secondary peak and the primary peak calculating with the correlation function a precise correlation constant from the calibration order number, the precisely identified wavelength and the relative positioning; and utilizing the precise correlation constant with the correlation function to assign calibrated wavelengths to associated order numbers and thereby to secondary peak locations with respect to the spectra locations.

25. The method of claim 24 wherein the multiple source comprises a source of radiation and a first optical element inserted in the radiation, the first optical element has an index of refraction (n) related to wavelength, and the order number (m) is identified to peak wavelength (L) in accordance with the correlation constant (T') by the correlation function $m = nT'/L$.

26. The method of claim 25 wherein the multiple source is a Fabry-Perot low finesse etalon disposed to transmit the radiation in a fringe pattern comprising the multiplicity of secondary peaks.

27. The method of claim 26 wherein the low finesse etalon comprises a plate of uncoated fused silica.

28. The method of claim 24 wherein the calibration data define a calibration profile, and the step of ascertaining comprises storing the calibration profile, estimating a centroid wavelength of the calibration profile with respect to the spectral locations, reversing the calibration profile about the centroid wavelength to create a reversed profile, adding the calibration profile and the reversed profile to create a combined profile, and fitting the calibration data to the combined profile to determine a offset between the estimated centroid wavelength and the primary spectral peak, whereby the offset defines the primary peak location with respect to the spectral locations.

29. The method of claim 28 wherein the calibration source is a neodymium doped yttrium aluminum garnet filter.

30. A spectrometric instrument having a characteristic intrinsic profile for a hypothetically thin spectral line in each segment of a selected spectral range, each intrinsic profile having an associated intrinsic width, the instrument including a line source of at least one narrow spectral line in at least one selected segment of the spectral range, and each narrow spectral line having an associated line width substantially narrower than the intrinsic width for a corresponding selected segment, and the instrument further including a standardizing system comprising:

specifying means for specifying a target profile for a hypothetically thin spectral line in each selected segment, initial means for initially operating the instrument with the line source to produce a set of profile data for each narrow spectral line such that each set of profile data is representative of the intrinsic profile for a corresponding selected segment, computing means for computing a transformation filter for transforming each set of profile data to a corresponding target profile for each selected segment, operating means for normally operating the instrument with a sample source to produce sample data representative of a sample spectrum, and application means for applying the transformation filter to the sample data in each selected segment to generate standardized sample data representative of the sample spectrum.

31. The apparatus of claim 30 further comprising background means for preliminarily operating the instrument to store nominal background data, and correcting the profile data and the sample data with the nominal background data.

32. The apparatus of claim 30 wherein the line source is an etalon structure comprising a high finesse Fabry-Perot etalon.

33. The apparatus of claim 32 wherein the etalon comprises a thin polymer film having a semitransparent gold coating on each side thereof, each coating being sufficient to provide between 1% and 10% transmission.

34. The apparatus of claim 33 wherein the film is between 10 and 25 micrometers thick.

35. The apparatus of claim 33 wherein the film is nitrocellulose.

36. The apparatus of claim 33 wherein the etalon structure further comprises a pair of planar glass windows with the etalon sandwiched therebetween.

37. The apparatus of claim 30 further comprising calibration means for establishing a wavelength calibration for the instrument, combining means for combining the wavelength calibration with the transformation filter to effect a correction matrix, operating means for operating the instrument with a sample source to produce sample data representative of a sample spectrum, and application means for applying the correction matrix to the sample data to generate calibrated standardized data representative of the sample spectrum.

38. The apparatus of claim 37 wherein the instrument further includes a wavelength calibration source of radiation, and the calibration means comprises means for operating the instrument with the wavelength calibration source to produce calibration data, and applying the transformation filter to the calibration data to generate standardized calibration data constituting the wavelength calibration.

39. The apparatus of claim 38 further comprising background means for preliminarily operating the instrument to store nominal background data, and correcting the calibration data, the profile data background data and the sample data with the nominal background data.

40. The apparatus of claim 37 wherein the instrument has a nominal calibration of spectral wavelength versus spectral locations in the spectral range, the instrument further includes a calibration source of at least on primary spectral peak of precisely identified wavelength and a multiple source of a multiplicity of secondary peaks spaced across the spectral range, each secondary peak has an integer order number identified by correlation function to a peak wavelength in accordance with a correlation constant, and the calibration means comprises:
- additional means for additionally operating the instrument with the calibration source to produce calibration data representative of the primary spectral peak, and further additionally operating the instrument with the multiple peak source to produce secondary data representative of the multiplicity of secondary peaks;
- ascertaining means for ascertaining from the calibration data a primary peak location with respect to the spectral locations, and further ascertaining from the secondary data a set of secondary peak locations with respect to the spectral locations;
- estimating means for estimating with the correlation function the correlation constant in accordance with order number differential for at least two peak wavelengths determined by the nominal calibration;
- identifying means for identifying with the correlation function a calibration order number for at least one selected secondary peak located adjacent the primary peak, said identifying being effected in accordance with the estimated correlation constant and a preliminary wavelength determined for the selected secondary peak by the nominal calibration;
- interpolating means for interpolating from the selected secondary peak a precise relative positioning of the selected secondary peak and the primary peak;
- calculating means for calculating with the correlation function a precise correlation constant from the calibration order number, the precisely identified wavelength and the relative positioning; and
- utilizing means for utilizing the precise correlation constant with the correlation function to assign calibrated wavelengths to associated order numbers and thereby to secondary peak locations with respect to the spectral locations.

41. The apparatus of claim 40 wherein the multiple source is a Fabry-Perot low finesse etalon disposed to transmit the radiation in a fringe pattern comprising the multiplicity of secondary peaks.

42. The apparatus of claim 41 wherein the low finesse etalon comprises a plate of uncoated fused silica.

43. The apparatus of claim 40 wherein the calibration source comprises an optical standard of neodymium doped yttrium aluminum garnet.

44. A spectrometric instrument including a calibration source of at least one primary spectral peak of precisely identified wavelength, and a multiple source of a multiplicity of secondary peaks spaced across the spectral range, each secondary peak having an integer order number identified by correlation function to a peak wavelength in accordance with a correlation constant, the instrument having a nominal calibration of spectral wavelength versus spectral locations in a selected spectral range, and the instrument further including calibration means comprising:
- additional means for additionally operating the instrument with the calibration source to produce calibration data representative of the primary spectral peak, and further additionally operating the instrument with the multiple peak source to produce secondary data representative of the multiplicity of secondary peaks;
- ascertaining means for ascertaining from the calibration data a primary peak location with respect to the spectral locations, and further ascertaining from the secondary data a set of secondary peak locations with respect to the spectra locations;
- estimating means for estimating with the correlation function the correlation constant in accordance with order number differential for at least two peak wavelengths determined by the nominal calibration;
- identifying means for identifying with the correlation function a calibration order number for at least one selected secondary peak located adjacent the primary peak, said identifying being effected in accordance with the estimated correlation constant and a preliminary wavelength determined for the selected secondary peak by the nominal calibration;
- interpolating means for interpolating from the selected secondary peak a precise relative positioning of the selected secondary peak and the primary peak;
- calculating means for calculating with the correlation function a precise correlation constant from the calibration order number, the precisely identified wavelength and the relative positioning; and
- utilizing means for utilizing the precise correlation constant with the correlation function to assign calibrated wavelengths to associated order numbers and thereby to secondary peak locations with respect to the spectral locations.

45. The apparatus of claim 44 wherein the multiple source comprises a source of radiation and a first optical element inserted in the radiation, the first optical element has an index of refraction (n) related to wavelength, and the order number (m) is identified to peak wavelength (L) in accordance with the correlation constant (T') by the correlation function $m = nT'/L$.

46. The apparatus of claim 45 the multiple source is a Fabry-Perot low finesse etalon disposed to transmit the radiation in a fringe pattern comprising the multiplicity of secondary peaks.

47. The apparatus of claim 46 wherein the low finesse etalon comprises a plate of uncoated fused silica.

48. The apparatus of claim 46 wherein the calibration source is a neodymium doped yttrium aluminum garnet filter.

49. An etalon structure including a high finesse etalon for passing near infra-red spectral lines, the etalon comprising a thin polymer film having a semitransparent gold coating on each side thereof, each coating being sufficient to provide between 1% and 10% transmission, the etalon structure further including a pair of planar glass windows with the etalon sandwiched therebetween.

50. The etalon structure of claim 49 wherein the film is between 10 and 25 micrometers thick.

51. The etalon structure of claim 49 wherein the film is nitrocellulose.

* * * * *